United States Patent
Heyl et al.

(10) Patent No.: US 10,017,028 B2
(45) Date of Patent: Jul. 10, 2018

(54) HEAT EXCHANGER FOR REFRIGERANT CIRCUITRY

(71) Applicant: Halla Visteon Climate Control Corp., Daejeon (KR)

(72) Inventors: Peter Heyl, Cologne (DE); Tobias Haas, Cologne (DE); Marc Graaf, Krefeld (DE); Milan Moravek, Gbely (SK); Jiri Dobner, Zadverice (CZ); Jan Gregus-Kollar, Skalica (SK)

(73) Assignee: HANON SYSTEMS, Daejeon-si (KR)

( * ) Notice: Subject to any disclaimer, the term of this patent is extended or adjusted under 35 U.S.C. 154(b) by 134 days.

(21) Appl. No.: 14/383,596

(22) PCT Filed: Nov. 7, 2013

(86) PCT No.: PCT/KR2013/010084
§ 371 (c)(1),
(2) Date: Sep. 9, 2014

(87) PCT Pub. No.: WO2014/073887
PCT Pub. Date: May 15, 2014

(65) Prior Publication Data
US 2015/0251517 A1    Sep. 10, 2015

(30) Foreign Application Priority Data
Nov. 8, 2012 (DE) .......... 10 2012 110 701

(51) Int. Cl.
*B60H 1/00*        (2006.01)
*F25B 39/00*       (2006.01)
(Continued)

(52) U.S. Cl.
CPC ......... *B60H 1/00342* (2013.01); *F25B 30/02* (2013.01); *F25B 39/00* (2013.01);
(Continued)

(58) Field of Classification Search
CPC .......... F28F 9/026; F28F 9/028; F28F 9/0265; F28F 9/0256; F28F 9/0275; F28F 9/0246;
(Continued)

(56) References Cited

U.S. PATENT DOCUMENTS

| 802,037 | A | * | 10/1905 | Giller | ...................... F16K 15/10 137/516.13 |
| 1,236,056 | A | * | 8/1917 | Coleman | ................. F16K 15/02 137/519 |

(Continued)

FOREIGN PATENT DOCUMENTS

| DE | 19515527 | A1 | * | 10/1996 | ........... B60H 1/3227 |
| JP | 53-127622 | U1 |   | 10/1978 |                        |

(Continued)

*Primary Examiner* — Grant Moubry
*Assistant Examiner* — For K Ling
(74) *Attorney, Agent, or Firm* — Schumaker, Loop & Kendrick, LLP; James D. Miller

(57) ABSTRACT

The present invention relates to the heat exchanger 1 of refrigerant circuitry of an air-conditioning system for a vehicle, which enables a bidirectional pass flow. The air-conditioning system is configured to perform a combined operation of cooling device mode and heat pump mode, the heat exchanger 1 is formed in the form of a multi-pass, and the flow direction of a refrigerant varies depending on operation mode. The first heat exchanger 1 formed in the form of a multi-pass includes header pipes 2 and 3, flow paths assigned to respective passes, and means configured to partition an internal volume space of one or more header pipes 2 and 3 into independent regions. A first pass of the heat exchanger 1 has a greater flow cross section and greater heat exchange surface than the last pass.

14 Claims, 10 Drawing Sheets

(51) Int. Cl.
    *F28F 9/02*                 (2006.01)
    *F28F 27/02*            (2006.01)
    *F28D 1/053*            (2006.01)
    *F25B 30/02*            (2006.01)
    *F28D 21/00*            (2006.01)

(52) U.S. Cl.
    CPC ......... *F28D 1/05375* (2013.01); *F28D 21/00* (2013.01); *F28F 9/028* (2013.01); *F28F 9/0212* (2013.01); *F28F 27/02* (2013.01); *F28D 2021/0068* (2013.01); *F28D 2021/0084* (2013.01); *F28D 2021/0085* (2013.01); *F28F 2250/06* (2013.01)

(58) Field of Classification Search
    CPC .. F28D 1/05375; F28D 1/05325; F16K 15/02; F16K 15/021; F16K 15/023; F16K 15/06; F16K 15/10; F16K 15/026; F16K 15/028; F25B 39/028; F16L 15/00
    USPC ............... 165/173, 174, 101, 103, 146, 147; 137/533, 533.17, 533.19, 534
    See application file for complete search history.

(56) References Cited

U.S. PATENT DOCUMENTS

| | | | | |
|---|---|---|---|---|
| 1,768,841 A * | 7/1930 | Holdsworth | ............ | F16K 15/10 137/493.9 |
| 4,819,689 A * | 4/1989 | Owsley | ................ | F04B 39/102 137/512.1 |
| 4,907,616 A * | 3/1990 | Bergsma | .............. | F16K 15/023 137/38 |
| 5,101,640 A * | 4/1992 | Fukushima | ........... | F25B 49/027 165/101 |
| 5,157,944 A * | 10/1992 | Hughes | ................ | F25B 39/028 165/139 |
| 5,469,884 A * | 11/1995 | Madrid | ................ | F16K 15/026 137/515.7 |
| 5,511,583 A * | 4/1996 | Bassett | ............... | F04B 39/1033 137/512.1 |
| 5,546,981 A * | 8/1996 | Li | .......................... | F16K 15/028 137/493.3 |
| 5,730,212 A * | 3/1998 | Yamamoto | ............... | F25B 39/04 165/110 |
| 6,971,406 B2 * | 12/2005 | Takahashi | ............. | F16K 15/026 137/538 |
| 7,337,832 B2 * | 3/2008 | Hu | ........................ | F28D 1/0443 165/140 |
| 7,461,687 B2 * | 12/2008 | Han | .................... | F28D 1/05366 165/100 |
| 7,503,382 B2 * | 3/2009 | Maezawa | ................ | F25B 39/00 165/144 |
| 7,594,509 B2 * | 9/2009 | Burk | ................. | A61M 16/1045 128/201.13 |
| 8,235,101 B2 * | 8/2012 | Taras | ...................... | F25B 13/00 165/101 |
| 2007/0131405 A1 * | 6/2007 | Harada | ................. | F28F 9/0246 165/178 |

FOREIGN PATENT DOCUMENTS

| | | | | |
|---|---|---|---|---|
| JP | 63243688 A | | 10/1988 | |
| JP | 03-152365 | | 6/1991 | |
| JP | 06023806 U | * | 3/1994 | .............. B60H 1/32 |
| JP | 06-229896 A | | 8/1994 | |
| JP | 07-127948 A | | 5/1995 | |
| JP | H07280388 A | | 10/1995 | |
| JP | 09-021470 | | 1/1997 | |
| JP | 07-032266 U | | 3/1999 | |
| JP | 11-304377 A | | 11/1999 | |
| JP | 2001141382 A | | 5/2001 | |
| JP | 2003152365 A | | 5/2003 | |
| JP | 2003260927 A | | 9/2003 | |
| JP | 2004-177041 A | | 6/2004 | |
| JP | 2004177041 A | * | 6/2004 | ........... F28F 9/0265 |
| JP | 2005127529 A | | 5/2005 | |
| JP | 2005233185 A | | 9/2005 | |
| JP | 2008528946 A | | 7/2008 | |
| JP | 2011085368 A | | 4/2011 | |
| JP | 5234053 B2 | | 7/2013 | |
| KR | 20000031082 A | | 6/2000 | |
| KR | 1020050118828 A | | 12/2005 | |
| KR | 1020070091217 A | | 9/2007 | |

* cited by examiner

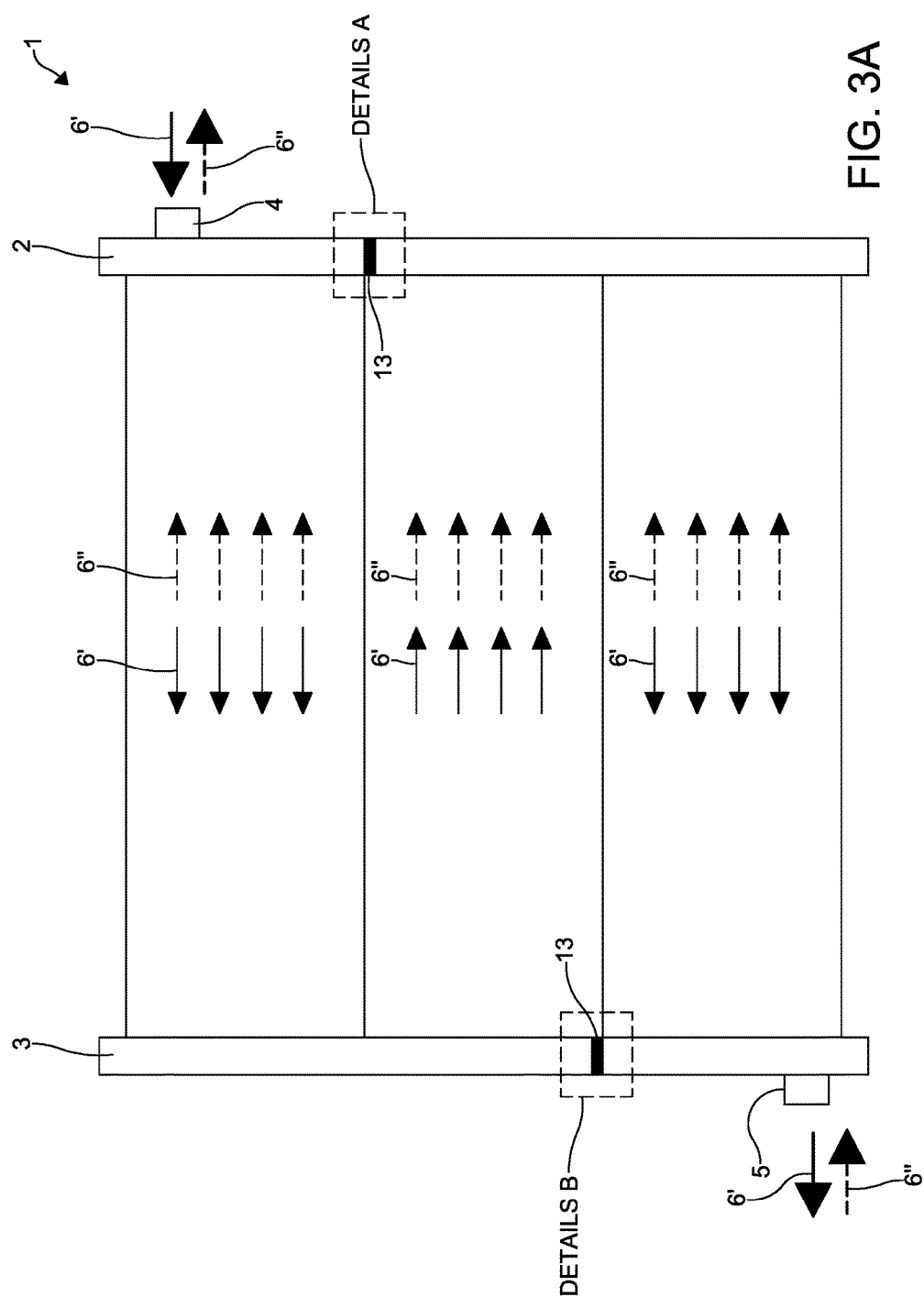

HEAT EXCHANGER FOR REFRIGERANT CIRCUITRY

CROSS-REFERENCES TO RELATED APPLICATIONS

This application is a United States national phase application based on PCT/KR2013/010084 filed Nov. 7, 2013 which claims the benefit of German Patent Application No. DE 10 2012 110 701.7, filed Nov. 8, 2012. The entire disclosures of the above applications are hereby incorporated herein by reference.

BACKGROUND

Exemplary embodiments of the present invention relate to a heat exchanger for the refrigerant circuitry of a vehicle air-conditioning system. Such a heat exchanger is configured to include a header pipe and allow a pass flow in a multi-pass way and bidirectionally. The air-conditioning system is configured to perform a combination of cooling mode and heating mode. The flow direction of a refrigerant within the heat exchanger depends on operation mode.

Furthermore, the present invention relates to an apparatus for partitioning the internal volume space of the header pipe of a heat exchanger and changing the flow of a fluid in the header pipe of the heat exchanger.

A conventional air-conditioning system for a vehicle is formed of a combined cooling device and heat pump system. A heat exchanger configured to operate as a condenser in cooling device mode and to discharge heat from a refrigerant to ambient air functions to absorb heat from ambient air as an evaporator in heat pump mode.

According to a prior art, for example, a supercooling section and an integrated high-pressure accumulator are formed in a heat exchanger, that is, a multi-pass heat exchanger used as the condenser. In the refrigerant circuitry of a vehicle air-conditioning system, the condenser basically includes 2 or 4 passes. A face in which heat exchange is performed is formed of flat tube profiles connected by ribs on the air side. When fabricating such a heat exchanger, the flat tube profiles are inserted into header pipes in which slots are formed on both ends thereof on the refrigerant side and then soldered. In order to change the direction of the refrigerant mass flux, a separation component is provided. The slots are provided on a wall at desired locations on the outside of the header pipe using laser cutting or stamping, for example, and the flow cross sections of the header pipes are closed by a small-sized and stamped plate. In this case, the small-sized plate corresponds to the separation component. By using the separation component, the heat exchanger is partitioned into, for example, 2 or 4 partial regions, so-called passes. By using the separation component, the heat exchanger is partitioned from the refrigerant side to n+1 passes.

In particular, when the air-conditioning system operates in cooling device mode, in a heat exchanger used as the condenser, a high-pressure accumulator is conventionally disposed between the second last pass and the last pass in the case of a system including thermostatic expansion valves. Such an accumulator is disposed and formed in the condenser. In the accumulator, the phases of an almost condensed refrigerant are separated from each other. Thereafter, a settled liquid refrigerant flows through the last pass of the condenser. Accordingly, a liquid refrigerant that has a much higher density than a gaseous refrigerant and that requires a flow cross section smaller than a two-phase mixture may be applied to the last pass. For such a reason, in the prior art, the last pass has a supercooling section that has much smaller flat tubes than those of previous passes.

In addition, the condenser may include a filter screen and dry means.

When the refrigerant circuitry operates in heat pump mode, the same heat exchanger is used as the evaporator. In this case, the refrigerant expands to a pressure level at which a corresponding saturation temperature is lower than temperature of ambient air. Accordingly, the refrigerant absorbs heat from the ambient air and discharges the absorbed heat.

An expanded 2-phase refrigerant is flown and evaporated through the original supercooling section. The section of the heat exchanger that operates as the evaporator is a section designed to allow the pass flow of a liquid refrigerant, a much higher density according to a small number of flat tubes, and a small flow cross section based on the much higher density. The section of the heat exchanger has a very high pressure loss in heat pump mode. This is because the density of the refrigerant is reduced according to an increase of evaporation.

The density of the refrigerant in heat pump mode becomes very low on the lower pressure side of the refrigerant circuitry due to the low pressure level. Accordingly, an additional flow pressure loss has a bad influence on performance and efficiency of a heat pump system.

Furthermore, in heat pump mode according to ambient air as refrigerant circuitry and a heat source in a temperature less than 0° C., there is a danger that the heat exchange surfaces of the heat exchanger operating as the evaporator may be frozen.

The multi-pass structure of a heat exchanger that generates a high pressure level on the refrigerant side due to a low absorption density of the refrigerant causes an additional drop of a surface temperature of the heat exchanger and an increase in the danger of freezing resulting from the additional drop.

There is known the assembly of components of refrigerant circuitry in which a heat exchanger formed to be supplied with external air operates in a flow direction that is alternated on the refrigerant side. In such an assembly, when the heat exchanger operates as the condenser in cooling device mode, the refrigerant flows through the heat exchanger in a first flow direction. In contrast, when the heat exchanger operates as the evaporator in heat pump mode, the heat exchanger is supplied with the refrigerant so that the refrigerant flows through the heat exchanger in a second flow direction opposite the first direction. In particular, when the heat exchanger operates as the evaporator in heat pump mode, a pressure level of the refrigerant is reduced. Accordingly, in heat pump mode, not a refrigerant that has almost been evaporated or overheated, but a refrigerant that is in a 2-phase state after decompression is flown through the supercooling section of the condenser in cooling device mode with a much higher density. However, a very high pressure loss that is disadvantageous in heat pump mode is merely reduced, but is not optimally reduced.

In a heat exchanger inserted into refrigerant circuitry that enables a pass flow bidirectionally for a heat exchange between the refrigerant and ambient air, how the freezing of heat exchange surfaces can be technically controlled and prevented when the heat exchanger operates in heat pump mode has been known in the prior art. In such a prior art, for example, a freezing process is avoided so that a heat pump is turned off in a surrounding temperature less than 0° C., or the refrigerant circuitry switches from heat pump mode to cooling device mode for at least short time in order to melt the heat exchanger and operates in cooling device mode. In the proposed methods, however, the air-conditioning system has a very low output reduction.

EP 1 895 255 B1 proposes a heat exchanger assembly in which two distribution pipes are spaced apart from each other in parallel, a plurality of flow tubes is extended between the two distribution pipes so that the refrigerant can flow between the distribution pipe, and the plurality of flow tubes forms a channel with the distribution pipe so that a fluid can pass therethrough. A static separator for partitioning the hollow space of the first distribution pipe into a first chamber and a second chamber having determined ratios is disposed in the first distribution pipe. Such a heat exchanger assembly includes connection parts disposed between the distribution pipes and an external control device configured to switch between evaporator mode and condenser mode. In this case, the connection parts are open and closed so that the refrigerant is circulated in the form of a single pass in evaporator mode and in the form of a multi-pass in condenser mode through all the flow tubes. In such a heat exchanger assembly, a pass flow as 2 passes, for example, is possible in evaporator mode. In such a case, the refrigerant flows through passes larger than 2 passes in condenser mode.

SUMMARY

An embodiment of the present invention relates to providing a heat exchanger capable of changing maximum heat output while occupying a minimum space in heat pump mode in addition to in cooling operation mode and improving the heat exchanger therefor. In this case, a pressure level on the refrigerant side needs to be optimized in order to minimize a danger of freezing in heat pump mode. The sub-components of the heat exchanger and a method of manufacturing the same should not generate additional costs as compared with known systems.

Furthermore, the heat exchanger needs to be configured so that control technology for preventing freezing can be applied to the heat exchanger.

In one embodiment, the above object is solved by a heat exchanger according to the present invention which is formed of a component of the refrigerant circuitry of an air-conditioning system for a vehicle. The air-conditioning system is configured to perform a combination of cooling device mode and heat pump mode.

Such a heat exchanger includes a first header pipe and a second header pipe, a first refrigerant entrance and a second refrigerant entrance for the pass flow of a refrigerant, a plurality of flow paths, and means for partitioning the internal volume space of at least one header pipe into independent regions. The header pipes are spaced apart from each other and aligned in parallel. The flow paths are formed as fluid connection parts disposed in parallel between the header pipes, and passes are assigned to the respective flow paths. The heat exchanger is configured to allow a multi-pass flow and a bidirectional pass flow. The flow direction of the refrigerant within the heat exchanger depends on operation mode of the air-conditioning system. In this case, the flow direction of the refrigerant in cooling device mode is opposite the flow direction of the refrigerant in heat pump mode.

The header pipes function as distributors for distributing the refrigerant into different flow paths in the flow direction of the refrigerant and along the respective regions of the header pipes. The header pipes are also designated as distribution pipes in accordance with the subdivided functions.

In accordance with a concept of the present invention, the first pass of the heat exchanger has a greater flow cross section and heat exchange surface than the last pass in the flow direction of the refrigerant in cooling device mode. Furthermore, the first refrigerant entrance for introducing the refrigerant in the flow direction of the refrigerant in cooling device mode is formed to have a flow cross section that is greater than or equal to that of the second refrigerant entrance for discharging.

The heat exchanger may be formed of a refrigerant-air heat exchanger configured to supply heat from ambient air to the refrigerant and to discharge heat to air to be supplied from the refrigerant to the passenger space or ambient air. In cooling device mode that is first operation mode of the air-conditioning system, the heat exchanger operates as a condenser/gas coolant. In heat pump mode in which ambient air is used as a heat source, the heat exchanger functioning as the evaporator is supplied with the refrigerant.

In this case, the heat exchanger may be formed without a supercooling section, and may be disposed in the refrigerant circuitry without an accumulator. The refrigerant may flow through at least two passes of the heat exchanger in cooling device mode.

In accordance with one construction of the present invention, the first refrigerant entrance for introducing the refrigerant in cooling device mode has an inside diameter greater than 8 mm. In this case, the inside diameter may be in a range of 10 mm to 14 mm.

In accordance with another construction of the present invention, the second refrigerant entrance for discharging the refrigerant in cooling device mode has an inside diameter greater than 6 mm. In this case, the inside diameter may be in a range of 6 on to 19 mm.

Furthermore, the object of the present invention is solved by a heat exchanger in the refrigerant circuitry of an air-conditioning system for a vehicle according to the present invention, including a header pipe, flow paths disposed in parallel, and at least two refrigerant entrances. Such a heat exchanger allows a bidirectional pass flow, and the flow direction of a refrigerant within the heat exchanger depends on operation mode of the air-conditioning system. The refrigerant may sequentially flow through the flow paths, the header pipe, and the refrigerant entrances in its flow direction or flow through the refrigerant entrances, the header pipe, and the flow paths. A connection block for connecting the refrigerant lines of the refrigerant circuitry on the side opposite the header pipe side is formed in the refrigerant entrance.

In accordance with a concept of the present invention, short lines, that is, additional fluid connection parts with the refrigerant entrances, are disposed between the header pipe and the connection block. That is, the short lines are connection parts connected in parallel to the refrigerant entrances and disposed between the header pipe and the connection block.

The header pipes of the heat exchanger according to the present invention may be directed vertically and spaced apart from each other horizontally. The flow paths are directed horizontally and spaced apart from each other vertically.

The flow paths disposed between the header pipes as the fluid connection parts may be formed of respective flat tube profiles. In this case, the flat tube profile has a depth of less than 20 mm. The depth of the flat tube profile may be in a range of 10 mm to 18 mm.

In accordance with one construction of the present invention, ribs having the same depth as the flat tube profiles are disposed between the flat tube profiles on the air side. In this case, the depth means the dimension of the flat tube profile that is vertically measured in the flow direction of air and a length direction along which a fluid flows.

The header pipes may be integrally formed or formed of 2 parts, and each may have a diameter or width greater than the depth of the flat tube profile.

In order to minimize a pressure loss on the refrigerant side and to reduce a danger of the freezing of the heat exchange surfaces in heat pump mode, the number of passes along which the refrigerant flows is controlled by the flow direction of the refrigerant through the heat exchanger depending on operation mode of the air-conditioning system. Furthermore, heat output exchanged in cooling device mode is optimized.

In accordance with a first alternative construction of the present invention, the heat exchanger is formed to allow a pass flow to two passes. In cooling device mode, a ratio of the number of flat tube profiles of the first pass to the number of flat tube profiles of a second pass in the flow direction of the refrigerant is in a range of 3 to 5, and the ratio may be in a range of 3.5 to 4.5.

In accordance with a second alternative construction of the present invention, the heat exchanger is formed to allow a pass flow to four passes. In cooling device mode, the numbers of flat tube profiles of passes through which the refrigerant sequentially flows in its flow direction have a ratio of 19:13:10:6. In this case, the flat tube profile may have a depth of 15 mm to 17 mm and a height of 1.0 mm to 1.6 mm. In this case, the height means the dimension of the flat tube profile that is measured in a direction vertical to the flow direction of air and to a length direction in which a fluid flows.

Furthermore, the object of the present invention is solved by an apparatus for partitioning the internal volume space of the header pipe of a heat exchanger and changing the flow of a fluid in the header pipe of the heat exchanger.

In accordance with a concept of the present invention, at least one movable separation component is disposed in the header pipe. In this case, the disposition of the separation component is determined based on the principle of a differential pressure and the alignment of the separation component within the header pipe. An opening part, that is, the entrance of a fluid, is open or closed by the separation component depending on a pressure difference between different sides and the alignment of the separation component.

The movable separation component includes a straight-line movable closing component and a stop component. In the closing state, the closing component comes in contact with the stop component. The closing component and a corresponding separation component are disposed in the direction of the header pipe that is disposed vertically, and such a direction may also be hereinafter denoted as a length direction.

The stop component and the closing component may be formed in the separation component as a multi-part. The stop component may have an external contour that coincides with the internal contour of the header pipe so that a narrow gap for soldering having +/−0.1 mm, preferably, +1-0.05 mm remains between the internal contour of the header pipe and the external contour of the stop component.

In accordance with an exemplary construction of the present invention, the stop component has an internal contour that forms the opening part, that is, the flow cross section of a fluid. Such an opening part is closed by the closing component in the closing state of the separation component.

The closing component may be formed in such a way as to move in a straight line in the length direction L.

In accordance with an additional construction of the present invention, the separation component includes means for guiding the movement of the movable closing component in relation to the stop component.

In accordance with a first alternative construction of the present invention, molding parts are formed in the internal contour of the stop component, and a guide component is formed in the closing component. In this case, the guide component may have a pin shape in which the guide component is extended in the length direction L in a direction vertical to a plane spread by the closing component and disposed in the closing component. The guide component comes in contact with the molding parts and remains movably in the length direction L. Accordingly, the molding parts of the stop component and the guide component form a guide for the movable closing component.

In accordance with a second alternative construction of the present invention, guide components for guiding the movable closing component is formed in the separation component. In this case, the guide components are uniformly disposed in the stop component along the circumference of the internal contour of the stop component and are formed as circular segments having step parts. The internal contour of the stop component may be formed as a circular opening part. Faces of an arc shape, of the step parts directed toward the center point of the circle and laid on the stop component, are provided to guide the movable closing component and are configured to coincide with the sides of the closing component. Furthermore, the guide components may be formed of parts for supporting and fixing a second stop component against the closing component.

The second stop component may be spaced apart from the first stop component in the height of the step parts of the guide component. In this case, the closing component may be retained between the stop components in such a way as to move in the length direction, and may be formed in a circular form. Opening parts disposed in the length direction are provided in the outer circumference of the closing component. The opening parts may be advantageously formed so that at least some of the opening parts open the entrance for a fluid when the closing component comes in contact with the stop component.

In accordance with another construction of the present invention, means for guiding the movement of the closing component in relation to the stop component is formed to prevent the twisting and rotation of the closing component.

In accordance with a concept of the present invention, an apparatus for partitioning the internal volume space of a header pipe and changing the flow of a fluid according to the present invention is formed in the heat exchanger within the header pipe according to the present invention. If the apparatus according to the present invention is disposed as described, the flow cross section and/or the heat exchange surfaces of the heat exchanger can be dynamically and controlled depending on operation mode, if necessary.

An exemplary fluid is a refrigerant or a refrigerant mixture, that is, a phase-change heat transfer medium, such as carbon dioxide (R744), R134a, or HFZO1234yf.

BRIEF DESCRIPTION OF THE DRAWINGS

The above and other aspects, features and other advantages will be more clearly understood from the following detailed description taken in conjunction with the accompanying drawings, in which:

FIG. 3A is a diagram showing a 3-pass heat exchanger including a separation component in a header pipe;

DESCRIPTION OF REFERENCE NUMERALS OF PRINCIPAL ELEMENTS IN THE DRAWINGS

Figure 1:
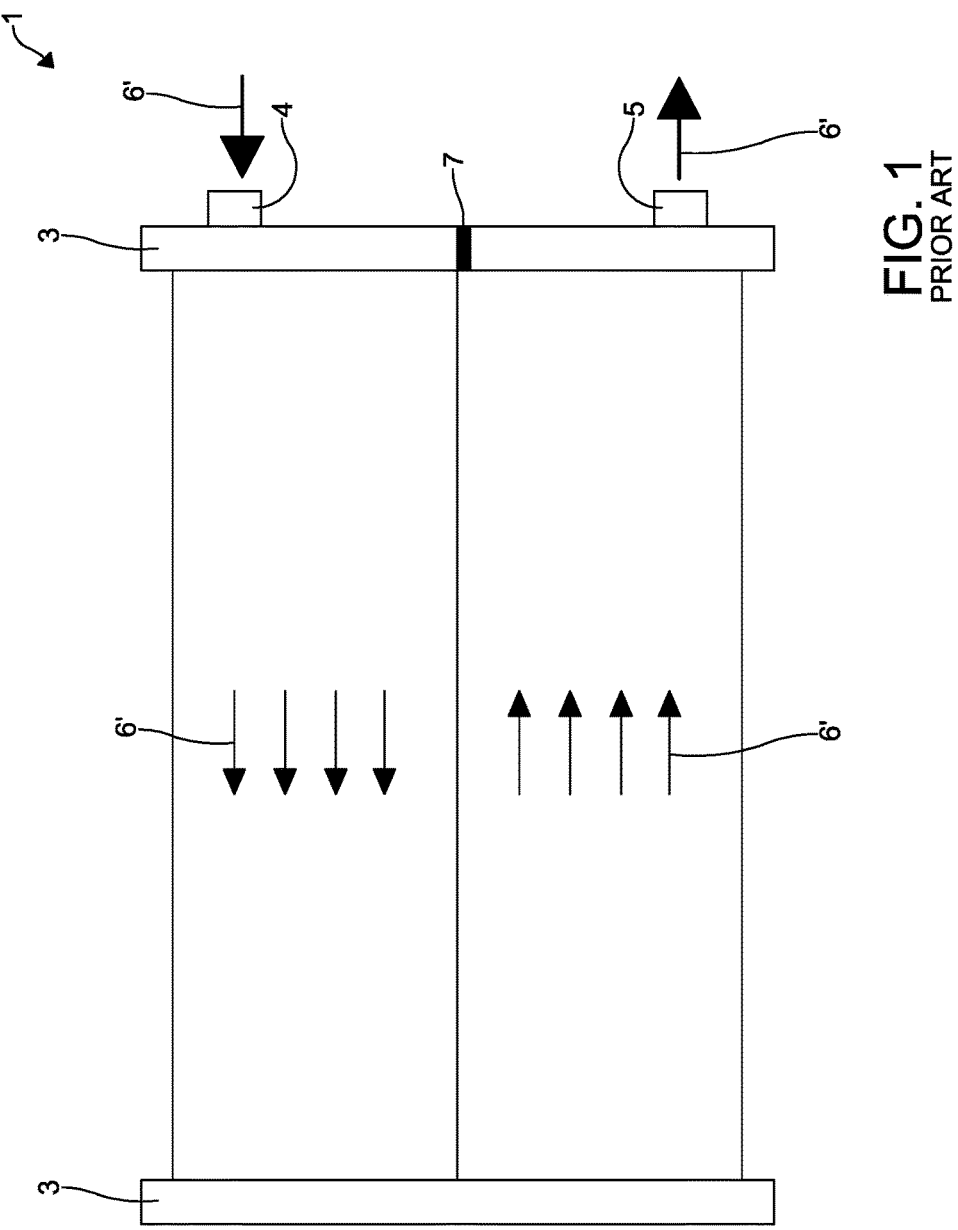
FIG. 1 is a diagram showing a 2-pass heat exchanger as a condenser/gas coolant in cooling device mode.

1: heat exchanger
2: first header pipe
3: second header pipe
4: first refrigerant entrance
5: second refrigerant entrance
6: flow direction of refrigerant
6': flow direction of refrigerant in cooling device mode
6": flow direction of refrigerant in heat pump mode
7: static separation component
8: flat face, closed face
9: edge
10: symmetrical face
11: locking component
12: retention component
13, 13': movable separation component
14, 14': closing component movable in a straight line, strike plate
15, 15': stop component of closing component, baffle plate
16: slot type opening parts of header pipes 2 and 3
17: flat tube profile
18, 18': internal contours of baffle plates 15 and 15'
19: external contour of strike plate 14
20: molding part of internal contour 18
21: notch of external contour 19
22, 23: guide component
24: second stop component
25: opening parts
26: gap
27: refrigerant line
28: connection block
29: short lines

DESCRIPTION OF SPECIFIC EMBODIMENTS

Hereinafter, embodiments of the present invention will be described with reference to accompanying drawings.

FIG. 1 shows a heat exchanger 1 having a 2-pass construction as a conventional condenser/gas cooler in cooling device mode. The heat exchanger 1 may be a component of the refrigerant circuitry of an air-conditioning system for a vehicle that is not shown.

A gaseous refrigerant compressed by a refrigerant compressor has a high temperature, and the refrigerant is introduced into a first header pipe 2 of the heat exchanger 1 through a first refrigerant entrance 4. The first header pipe 2 includes a static separation component 7 configured to partition the first header pipe 2 into regions that are independent from each other and closed. The static separation component 7 is made of a metal sheet, for example.

In an upper region, the gaseous refrigerant introduced into the first header pipe 2 is uniformly distributed into some flow paths of a first pass. The flow paths are indicated by solid-line arrows. The refrigerant flows from the first header pipe 2 to a second header pipe 3 in a flow direction 6' through the flow paths disposed in parallel. Flow channels through which the distributed mass fluxes pass in parallel in the same direction or partial mass fluxes of the refrigerant are called passes. In this case, the partial mass fluxes of the refrigerant have approximately the same state parameters.

The refrigerant transferred to the second header pipe 3 through some flow paths is mixed in the second header pipe 3 again and the uniformly distributed into some flow paths of the second pass. The refrigerant returns from the second header pipe 3 to the first header pipe 2 through the flow paths disposed in parallel. The refrigerant transferred through some flow paths is mixed in the lower region of the first header pipe 2. All the refrigerant mass fluxes are discharged from the heat exchanger 1 through a second refrigerant entrance 5 that is disposed in the lower region of the first header pipe 2. Accordingly, a refrigerant that has been cooled while discharging heat and partially liquefied is present in a liquid phase or two phases. Furthermore, a fully liquefied refrigerant may be further overcooled. That is, the fully liquefied refrigerant may have a temperature lower than a condensation temperature.

A relation between the areas of the 2 passes is changed by the density of the refrigerant that varies upon cooling and condensation in heat exchange surfaces and the cross-section areas of the flow paths.

Figure 2:
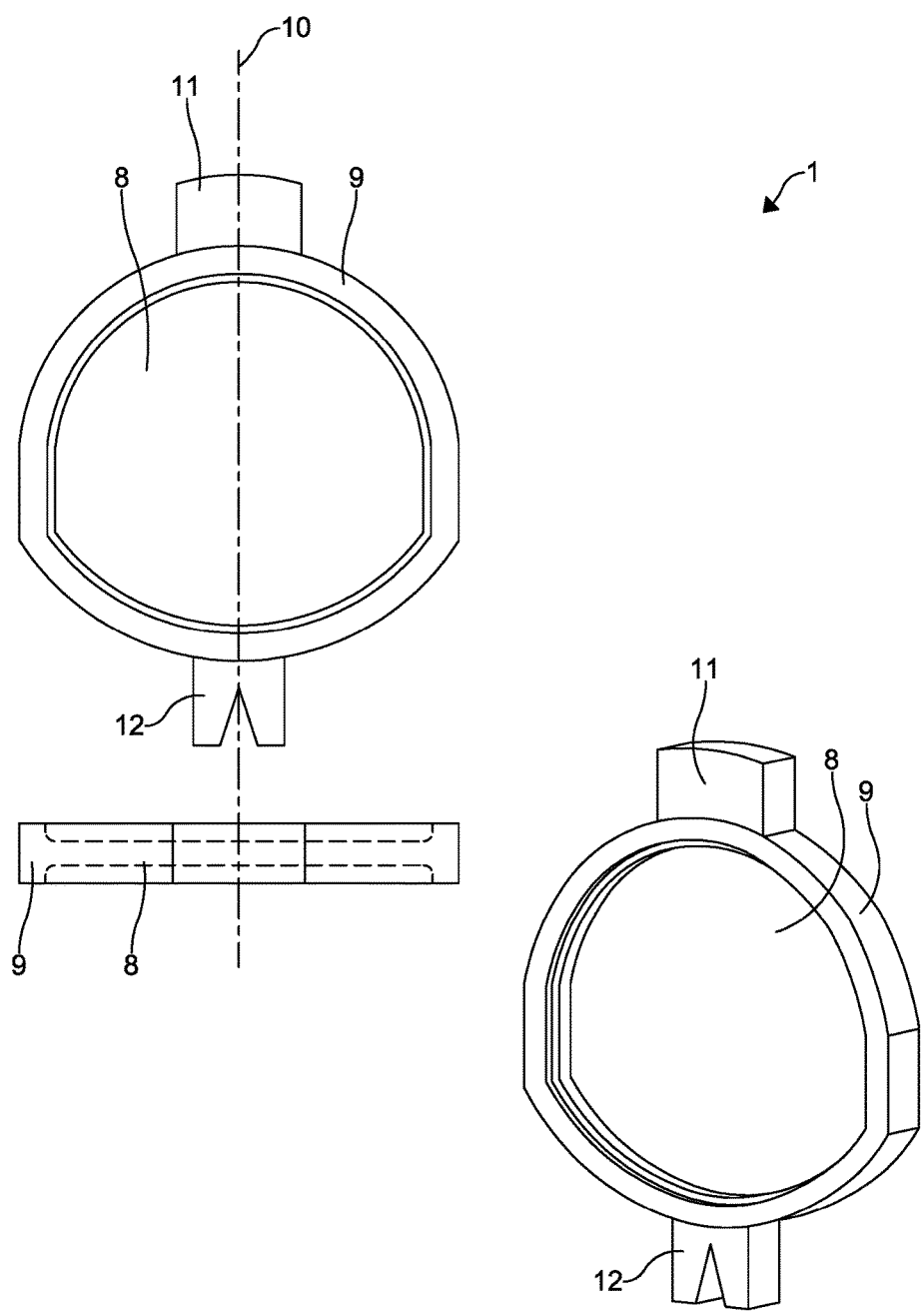
FIG. 2 is a diagram showing various types of a static separation component to be disposed in a header pipe.

FIG. 2 shows a conventional static separation component 7 to be disposed in the header pipes 2 and 3. The static separation component 7 that is made of a metal sheet and integrally formed using stamping has a flat face or closed face 8 that is fully surrounded closed by an edge 9. The closed face 8 has a sheet thickness smaller than the edge 9. Accordingly, the edge 9 is protruded to both sides of the closed face 8. Furthermore, the static separation component 7 is symmetrically formed to its symmetrical face.

The edge 9 has an external contour duplicated from the internal contour of each of the header pipes 2 and 3 by taking a tolerance into consideration. Furthermore, a locking component 11 and a retention component 12 are formed in the edge 9. The locking component 11 and the retention component 12 are formed in the external contour of the edge 9 and disposed in a symmetrical face 10. In this case, the locking component 11 is aligned across from the retention component 12.

When fabricating the heat exchanger 1, the static separation component 7 is retained in the retention component 12 and is inserted into the header pipes 2 and 3 in which slots are formed along with flat tube profiles that form the flow paths of the refrigerant between the header pipes 2 and 3. The locking component 11 functions to fix the separation component 7 to the inside of the header pipes 2 and 3 when fabricating the heat exchanger 1. After the separation component 7 and the flat tube profiles are inserted into the header pipes 2 and 3, the components are soldered. In this case, the edge 9 of the separation component 7 that has already been formed enables simple soldering. The static separation component 7 closes the flow cross section of the header pipes 2 and 3.

FIG. 3A shows a case where a 3-pass heat exchanger 1 including separation components 13 in two header pipes 2 and 3 operate in cooling device mode and a case where the 3-pass heat exchanger 1 operates in heat pump mode. Unlike in the construction of FIG. 1, the separation components 13 can be moved, but the separation component 7 of FIG. 1 is static. The flow direction 6' of a refrigerant in cooling device mode is indicated by solid-line arrows, and a flow direction 6" of the refrigerant in heat pump mode is indicated by dotted arrows.

The ends of the header pipes 2 and 3 are formed of respective plugs for sealing against the surroundings.

The separation components 13 are open and closed so that like in FIG. 1, the refrigerant is delivered to the first header pipe 2 through a first refrigerant entrance 4 and then flown to the second header pipe 3 through the flow paths of a first pass that are aligned in parallel. The separation component 13 of the first header pipe 2 closes the header pipe 2 so that the header pipe 2 has two separated regions. The refrigerant is mixed in the upper region of the second header pipe 3 and then switched to a second pass.

The refrigerant flows through the second pass in the opposite direction to the first pass. The refrigerant is mixed in the lower region of the first header pipe 2 and then switched to a third pass.

Thereafter, the refrigerant flows in the parallel direction to the first pass through the third pass. The refrigerant is mixed in the lower region of the second header pipe 3 and then discharged from the heat exchanger 1 through the second refrigerant entrance 5 as a refrigerant mass flux.

In cooling device mode, the refrigerant flows approximately up and down through the heat exchanger 1 that operates in the form of the three passes. A relation between the areas of the passes, that is, heat exchange surfaces and the cross-section areas of the flow paths, is controlled based on a behavior of the density of the refrigerant that varies when the refrigerant flows through the heat exchanger 1.

In contradiction to cooling device mode, in heat pump mode, the refrigerant flows through the heat exchanger 1 in the form of a single pass in the flow direction 6" approximately from bottom to top. The flow direction 6" of the refrigerant in heat pump mode is indicated by dotted arrows.

The flow direction of the refrigerant in heat pump mode may be directed from top to bottom. In contrast, in such a case, in cooling device mode, the refrigerant flows from bottom to top.

A refrigerant is introduced into the second header pipe 3 of the heat exchanger 1 through the second refrigerant entrance 5. The separation component 13 of the second header pipe 3 is open. That is, the two regions formed in the header pipe 3 are connected in a fluid-technical way. The refrigerant is distributed into all the flow paths of the heat exchanger 1 that connect the header pipes 2 and 3. Accordingly, the refrigerant flows through the heat exchanger 1 in the form of a single pass.

The separation component 13 is also open, and thus partial mass fluxes of the refrigerant are mixed in the first header pipe 2 in which the two regions are connected in a fluid-technical way. Thereafter, the refrigerant is discharged from the heat exchanger 1 through the first refrigerant entrance 4.

In accordance with the separation components 13, the number of passes through which the refrigerant sequentially passes and flows is changed in cooling device mode as compared with heat pump mode, for example. The heat exchange surface and flow cross section of the refrigerant may be dynamically changed, and may be controlled in accordance with each operation state and external conditions.

Each of the flat tube profiles that form the flow paths of the refrigerant between the header pipes 2 and 3 has a profile depth of less than 20 mm, and may have a profile depth of 16 mm±2 mm or 12 mm±2 mm. On the air side, the heat exchange surfaces are formed by the flat tube profiles in which ribs are disposed between the flat tube profiles. In this case, the rib has the same profile depth as the flat tube.

In the construction of the 2-pass heat exchanger 1, the flat tube profiles each having a profile depth of, for example, 16 mm±2 mm or 12 mm±2 mm are used. In cooling device mode, a ratio of the number of flat tubes of the first pass to the number of flat tubes of the second pass in the flow direction of the refrigerant is 3 to 5. In this case, a preferred ratio is 3.5 to 4.5.

In the construction of a 4-pass heat exchanger, flat tube profiles each having a profile depth of, for example, 16 mm±1 mm are used. In cooling device mode, the number of flat tubes of a first pass to the number of flat tubes of a fourth pass in the flow direction of the refrigerant have a ratio of 19:13:10:6.

The first refrigerant entrance 4 is connected to pipe that is formed of a refrigerant line (not shown). Such a pipe has an inside diameter of more than 10 mm, preferably 16 mm±1 mm.

The second refrigerant entrance 5 is also connected to pipe that is formed of a refrigerant line (not shown). Such a pipe has an inside diameter of more than 6 mm, preferably 10 mm±1 mm, 13 mm±1 mm, or 16 mm±1 mm.

The header pipes 2 and 3 are formed integrally or formed of 2 parts, and each has a width or diameter greater than the profile depth of the flat tube. Each of the header pipes 2 and 3 includes four plugs (not shown) for sealing each of the header pipes 2 and 3 against the surroundings, in addition to the one or more separation components 13 for closing the flow cross sections of the header pipes 2 and 3 and for partitioning the header pipes 2 and 3 into the separated volume spaces.

Figure 3B:
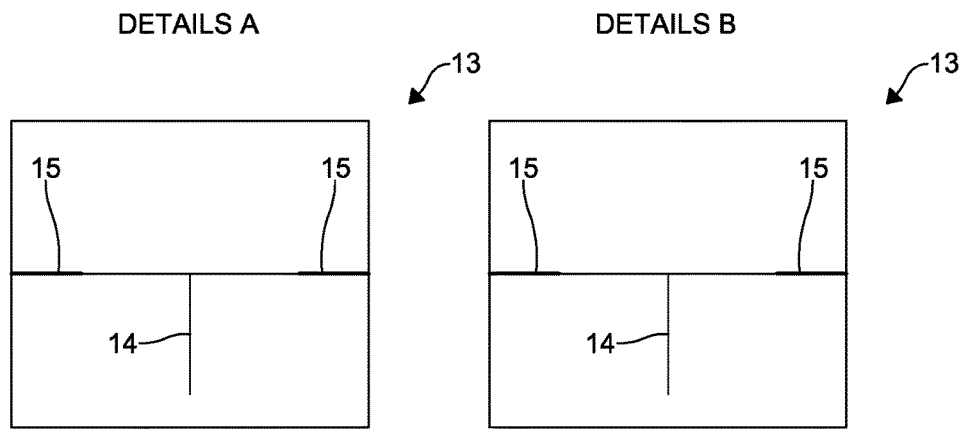
FIG. 3B is a diagram showing that the straight-line movable closing component of the separation component is closed.
Figure 3C:
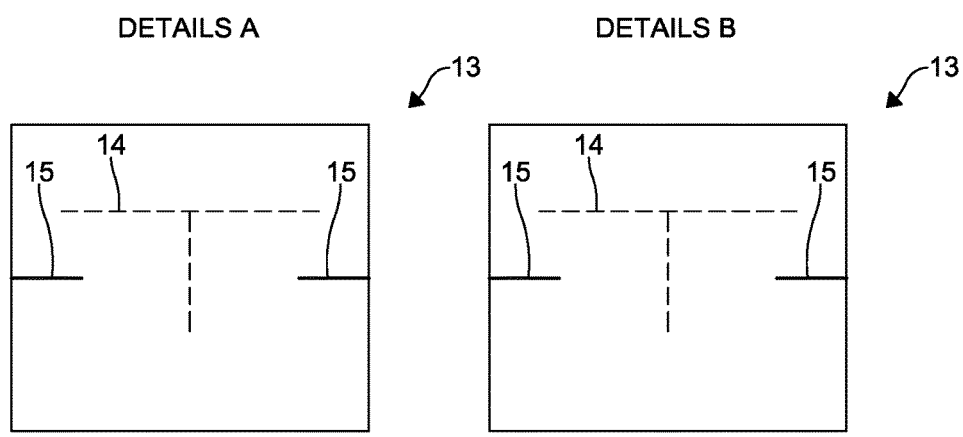
FIG. 3C is a diagram showing that the straight-line movable closing component of the separation component is opened.

FIGS. 3B and 3C show detailed diagrams of the separation components 13 of FIG. 3A each including a straight-line movable closing component 14.

The separation of passes is mechanically controlled by a differential pressure in the header pipes 2 and 3 and performed by the movable separation components 13. The separation component 13 functions as a valve when the heat exchanger 1 operates, and it is closed in cooling device mode and open in heat pump mode. Thus, the movable separation component 13 is formed similar to a check valve.

The movable separation components 13 function to partition the header pipes 2 and 3 into two regions having separated volume spaces for the purpose of an operation in cooling device mode or to form a common volume space by connecting the two regions in a fluid-technical way in heat pump mode.

FIG. 3B shows the separation components 13 in the closing state in which the header pipes 2 and 3 have the two separated volume spaces. In contrast, FIG. 3C shows the separation components 13 in the open state.

Each of the separation components 13 includes a straight-line movable closing component or a strike plate 14 and a stop component or baffle plate 15. In the closing state, the closing component 14 of the separation component 13 comes in contact with the stop component 15.

When the heat exchanger 1 operates in cooling device mode, the separation component 13 configured to have the stop component 15 attached thereto and formed of the straight-line movable closing component 14 is closed as shown in FIG. 3B. A gaseous high-temperature refrigerant that is introduced into the upper region of the first header pipe 2 through the first refrigerant entrance 4 of the heat exchanger 1 after being compressed at high pressure downward pressurizes the straight-line movable closing component 14, and the refrigerant is distributed into the flow paths of the first pass. The refrigerant is applied to both sides of the separation component 13 of the first header pipe 2 with different pressures attributable to the flow of the refrigerant through the flow paths of the first pass, the mixing and switch of the refrigerant in the second header pipe 3, and a pressure loss generated during the distribution of the refrigerant into the flow paths of the second pass. The pressure difference pushes the closing component 14 against the stop component 15, thereby closing the separation component 13. The state of the separation component 13 of the second header pipe 3 is the same. Accordingly, a flow is performed through the heat exchanger 1 in the form of the three passes. After generating heat, the refrigerant is discharged from the heat exchanger 1 in a liquid state or a liquid/vapor state through the second refrigerant entrance 5.

When the heat exchanger 1 operates in heat pump mode, the separation components 13 are open by the straight-line movable closing components 14. A 2-phase refrigerant that is introduced into the lower region of the second header pipe 3 of the heat exchanger 1 through the second refrigerant entrance 5 upward pressurizes the straight-line movable closing component 14, and the 2-phase refrigerant is distributed into the flow paths of the three passes. The refrigerant is distributed into the flow paths of the heat exchanger 1 through the entire second header pipe 3 and is flown in parallel through all the flow paths. The closing component 14 is pushed away from the stop component 15 due to the pressure of the introduced refrigerant. The separation component 13 is open. Pressures on the upper sides of the closing components 14 are always lower than those on the lower sides of the closing components 14 due to a pressure loss that is generated from the time when the refrigerant is introduced through the second refrigerant entrance 5 to the time until the refrigerant is discharged through the first refrigerant entrance 4. Accordingly, in heat pump mode, the closing components 13 remain open due to the pressure difference. Accordingly, the refrigerant flows through the heat exchanger 1 in the form of a single pass. After absorbing heat, the refrigerant is discharged from the heat exchanger 1 in a gaseous state through the first refrigerant entrance 4.

To this end, the straight-line movable closing components 14 are designed so that the resultant force of gravity, flow forces, and pressures generates opening and closing.

Figure 4A:
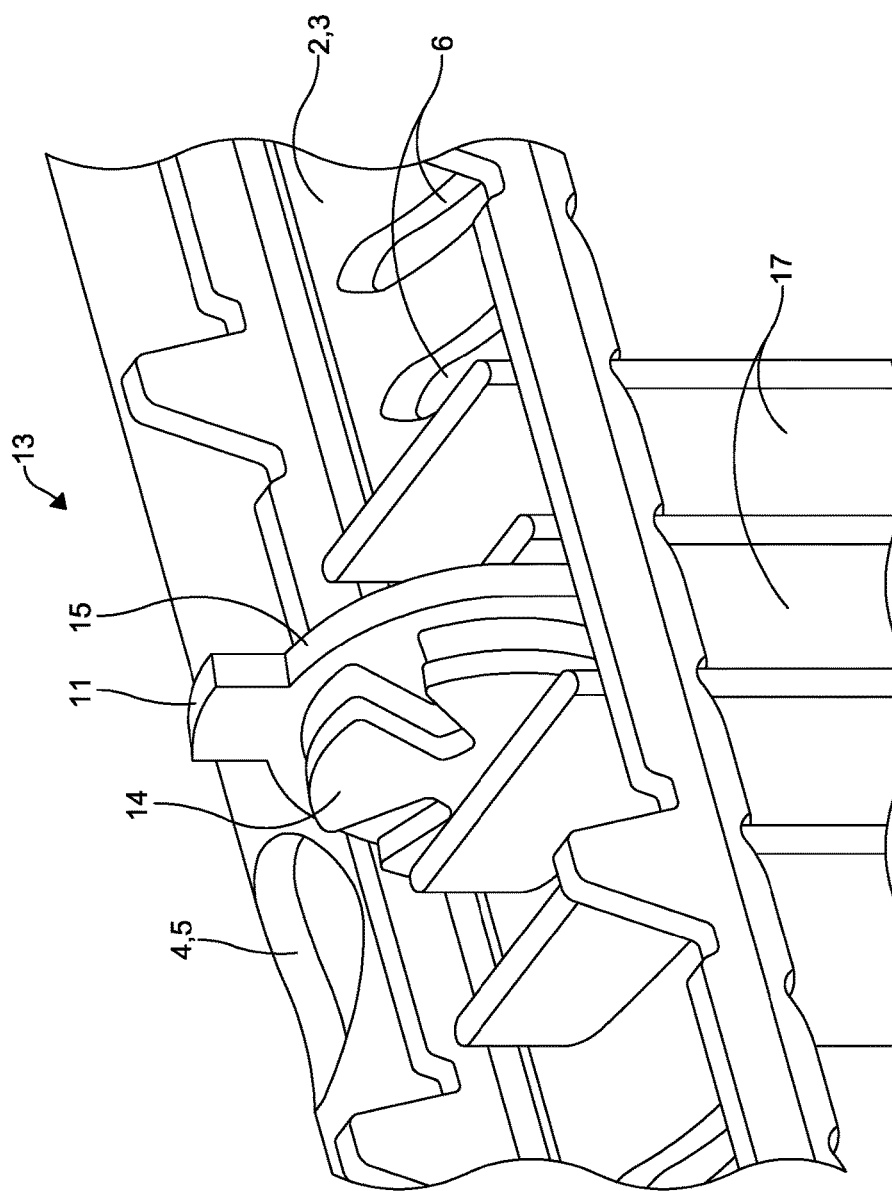
FIG. 4A is a diagram showing that a movable separation component of a first embodiment is disposed in a header pipe.

FIG. 4A shows that the movable separation component 13 is disposed in the header pipe 2, 3 in the assembly state of the heat exchanger 1. The illustrated parts of the header pipes 2 and 3 include the refrigerant entrances 4 and 5 and an outer wall in which slots are formed.

The flat tube profiles 17 that form the flow paths of the passes are inserted into the header pipes 2 and 3 through slot type opening parts 16 formed on the outer wall. In this case, the flat tube profiles 17 are inserted into the header pipes 2 and 3 up to at least 10 mm, preferably, up to an insertion depth of 8 mm. The movable separation components 13 are also inserted into the header pipes 2 and 3 through the slot type opening parts, but the slot type opening parts are not shown.

The baffle plate 15 of the separation component 13 that forms the flat tube profiles 17 and the stop component 15 is soldered to the outer wall of each of the header pipes 2 and 3. The baffle plate 15 is locked to the outer wall by means of the locking component 11. In this case, the locking component 11 is inserted into the outer wall on the opposite side of the slot type opening part 16 for inserting the separation component 13 into each of the header pipes 2 and 3. If the straight-line movable closing component 14 formed of a strike plate does not come in contact with the stop component 15 that is also denoted as the baffle plate, the movable separation component 13 is open.

In the open state of the separation component 13, the movable closing component 14 comes in contact with the flat tube profile 17 inserted into each of the header pipes 2 and 3. Accordingly, the flat tube profile 17 also functions as a stopper against the closing component 14 in the open state of the separation component 13.

When fabricating the heat exchanger 1, the separation component 13 is retained in the retention component 12 and inserted into each of the header pipes 2 and 3 in which the slots are formed. When fabricating the heat exchanger 1, as in the static separation component 7 of FIG. 2, the locking component 11 functions to fix the separation component 13 within each of the header pipes 2 and 3. After the separation components 13 are inserted into the header pipes 2 and 3, the components of the header pipes 2 and 3, the flat tube profiles 17, and the stop components 15 are soldered together.

Figure 4B:
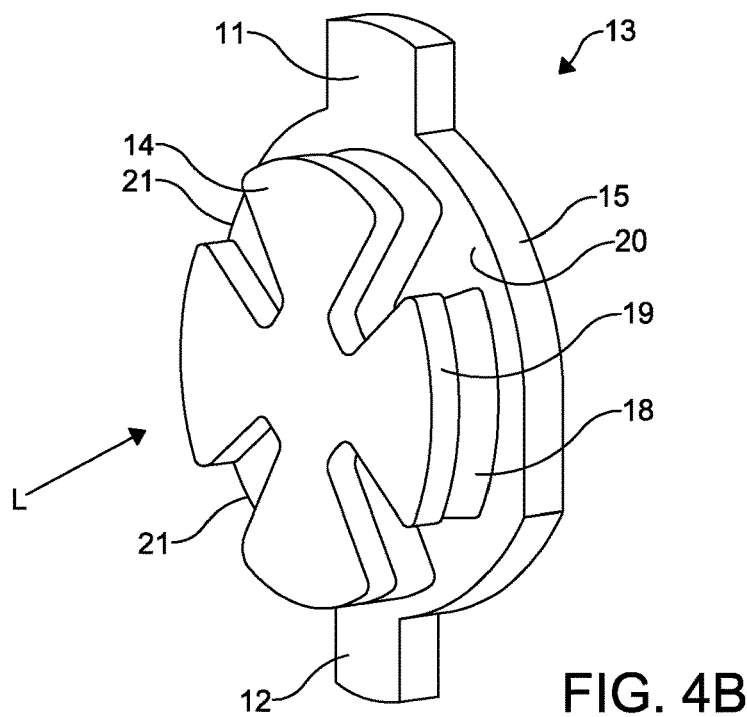
FIG. 4B is a front view of the separation component of FIG. 4A that is open.
Figure 4C:
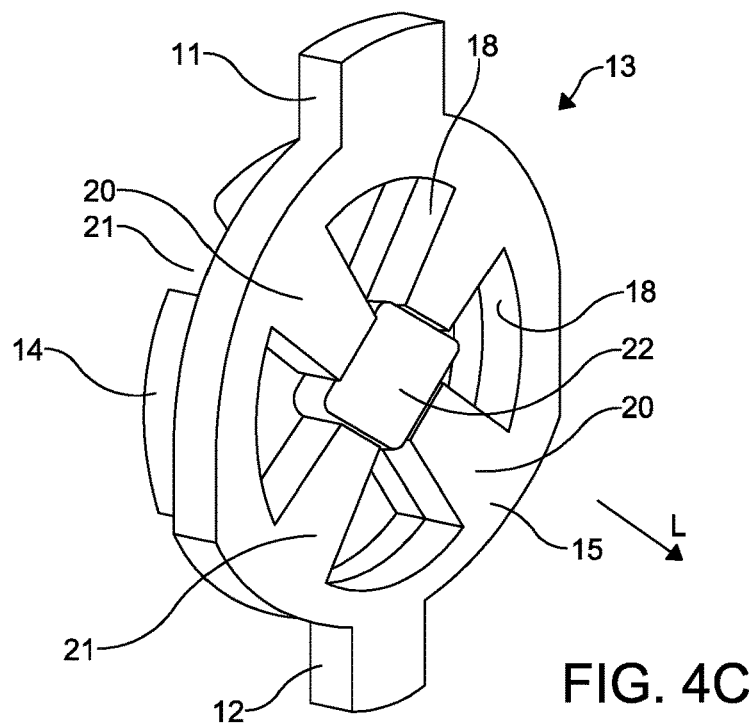
FIG. 4C is a rear view of the separation component of FIG. 4A that is open.

FIGS. 4B and 4C show the detailed diagrams of the movable separation component 13 of FIG. 4A. FIG. 4B is a front view of the separation component 13, and FIG. 4C is a rear view of the separation component 13.

The movable separation component 13 includes two components separated from each other by the strike plate 14 and the baffle plate 15. The two components are made of a metal sheet and fabricated using stamping, and may be formed to be symmetrical to its symmetrical face. The baffle plate 15 may be made of solderable materials having coating made of AA44045, preferably, AA3003, and the baffle plate 15 is fabricated to have a material thickness of at least 0.2 mm. In this case, the thickness of the baffle plate 15 may be changed in a range of 0.2 mm to 2.5 mm, preferably, in a range of 0.4 mm to 2.3 mm. In contrast, the strike plate 14 is made of materials that cannot be soldered, preferably, special steel, for example, AlSi 304 (DIN 1.4301), and the strike plate 14 is fabricated in a material thickness of at least 0.2 mm, preferably, in a range of 0.3 mm to 0.5 mm.

The baffle plate 15 includes an external contour configured to surround a circumference duplicated from the internal contour of each of the header pipes 2 and 3 on the edge side thereof by taking a tolerance into consideration. Furthermore, the external contour of the baffle plate 15 includes the locking component 11 and the retention component 12 disposed in the symmetrical face. In this case, the locking component 11 is aligned on the opposite side of the retention component 12.

In addition to the external contour, the baffle plate 15 includes an internal contour 18 configured to have a four-leaf clover shape and to open the flow cross section as a through opening part through the baffle plate 15. In this case, the through opening part is directed in a direction vertical to a plane stretched by the baffle plate 15.

The strike plate 14 also includes an external contour 19 that surrounds a circumference configured to have a four-leaf clover shape and duplicated from the internal contour 18 of the baffle plate 15 by taking a tolerance into consideration. In this case, the external contour 19 of the strike plate 14 has a greater size than the internal contour 18 of the baffle plate 15. Accordingly, in the closing state of the separation component 13, the strike plate 14 comes in contact with the baffle plate 15. In this case, the entire internal contour 18 of the baffle plate 15 is covered by the external contour 19 of the strike plate 14.

The dimensions of the external contour 19 of the strike plate 14 and the internal contour 18 of the baffle plate 15 have a tolerance of about 0.1 mm. Accordingly, the refrigerant may move through a gap between the header pipes 2 and 3 and the strike plate 14.

The internal contour 18 of the baffle plate 15 and the external contour 19 of the strike plate 14 are approximately circular, and include molding parts 20 and notches 21 disposed on the other side.

The strike plate 14 includes the four notches 21 in the external contour 19. The notches 21 are uniformly spaced apart from each other and are extended from their outer edges to the center point of the strike plate 14. In this case, the notches 21 are terminated after passing through about ⅓ of the diameter at the base of the strike plate 14. Accordingly, some regions of the strike plate 14 formed by the notches 21 are connected in a region directed toward the center point of the strike plate 14. In this case, the area of faces to be removed from an external appearance of the original circular shape of the strike plate 14 by the notches 21 is smaller than a total area of the strike plate having the same diameter and not having notches.

The strike plate 14 includes a guide component 22 as shown in FIG. 4C. In this case, the guide component 22 is aligned in a direction vertical to the plane stretched by the strike plate 14 and is extended in the length direction L from the center point of the strike plate 14. The guide component 22 having a pin shape has a cross section other than a circular cross section, for example, a polygon or an elliptical cross section.

The baffle plate 15 includes the four molding parts 20 in the internal contour 18. The molding parts 20 are uniformly spaced apart from each other and are extended from the outside to the center point of the baffle plate 15. In this case, each of the molding parts 20 is terminated after passing through about ⅓ of the internal contour 18 of the baffle plate 15. The dimensions of the molding parts 20 of the baffle plate 15 are the same as those of the notches 21 of the strike plate 14 including a tolerance so that the contours 18 and 19 are overlapped with the molding parts 20 in order to close the separation component 13.

The molding parts 20 of an internal contour 18 of the baffle plate 15 and the guide component 22 of the strike plate 14 are formed such that the guide component 22 is brought in contact with the end faces of the molding parts 20 and guided when the guide component 22 moves. In this case, the strike plate 14 remains intact so that it is not twisted and rotated from the baffle plate 15. This is because the guide component 22 has a cross section other than a circular cross section, that is, a square cross section as shown in FIG. 4C. The straight end faces of molding parts 20 of the internal contour 18 of the baffle plate 15 come in contact with the side edges of a square cross section of the guide component 22. Accordingly, the guide component 22 may slide and move only in the length direction L.

Figure 5A:
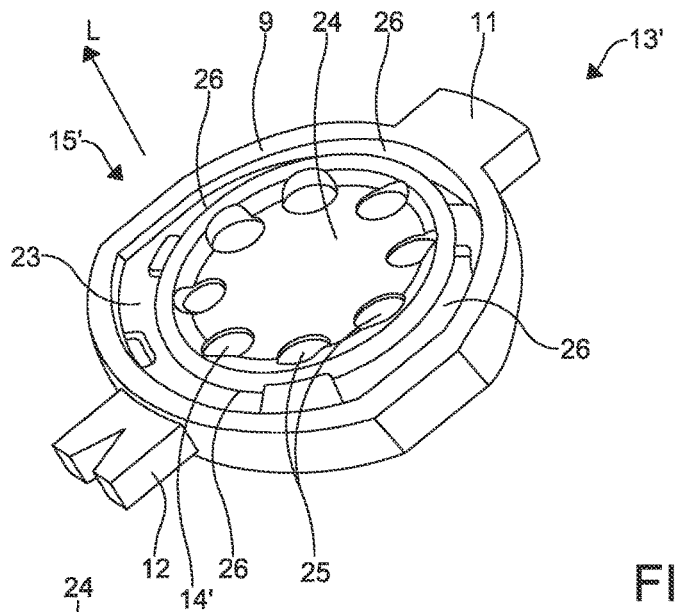
FIG. 5A is a diagram showing a movable separation component of a second embodiment that may be immediately mounted.
Figure 5B:
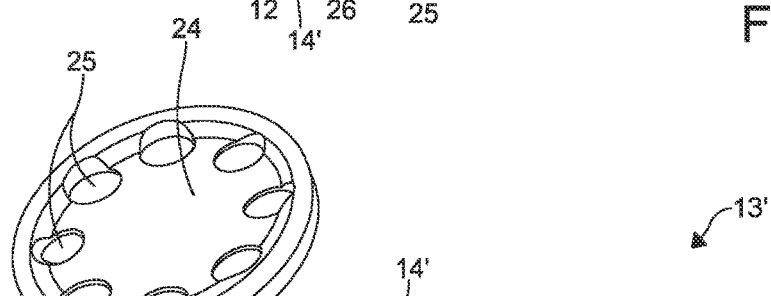
FIG. 5B is an exploded view of the separation component of FIG. 5A.
Figure 5B:
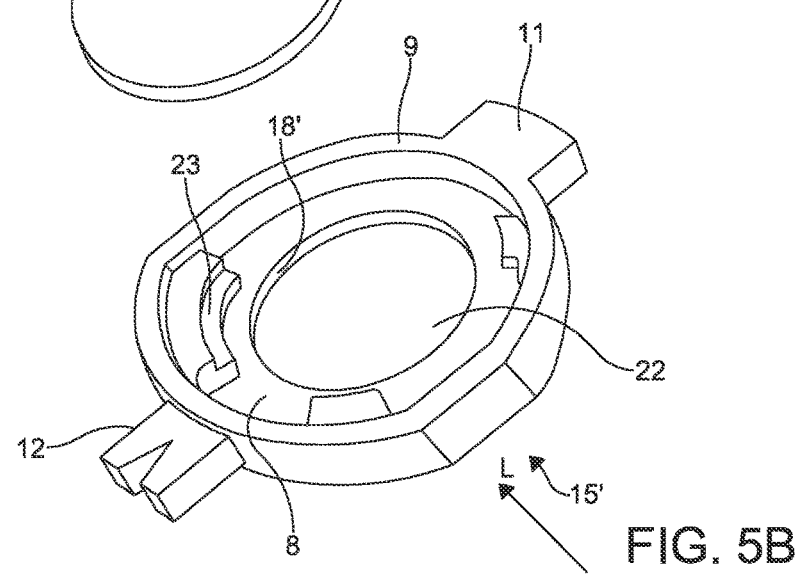
Figure 5C:
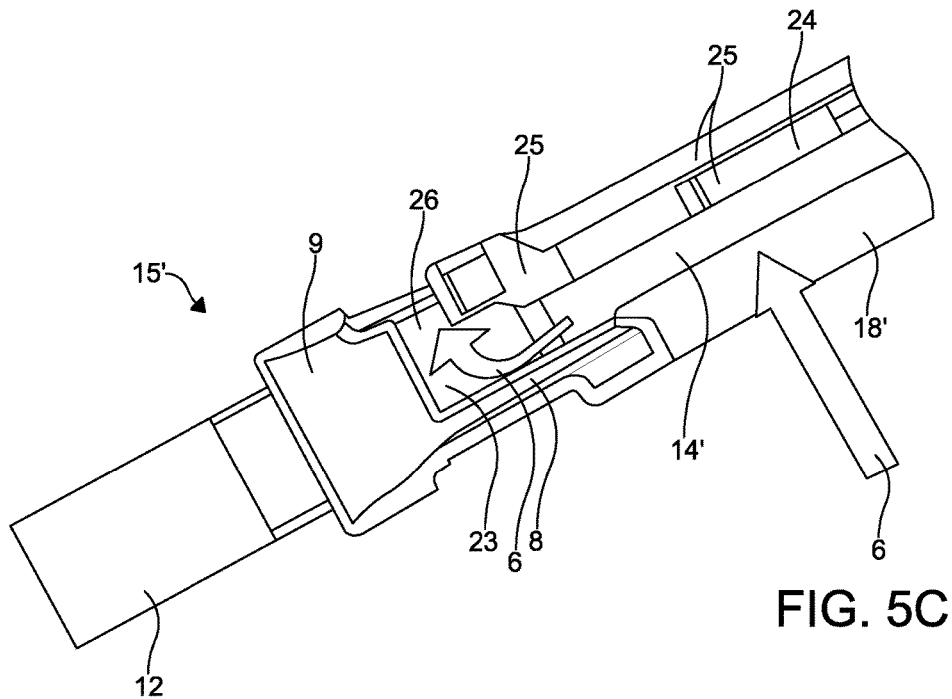
FIG. 5C is a cross-sectional view of the separation component of FIG. 5A that is in the open state.
Figure 5D:
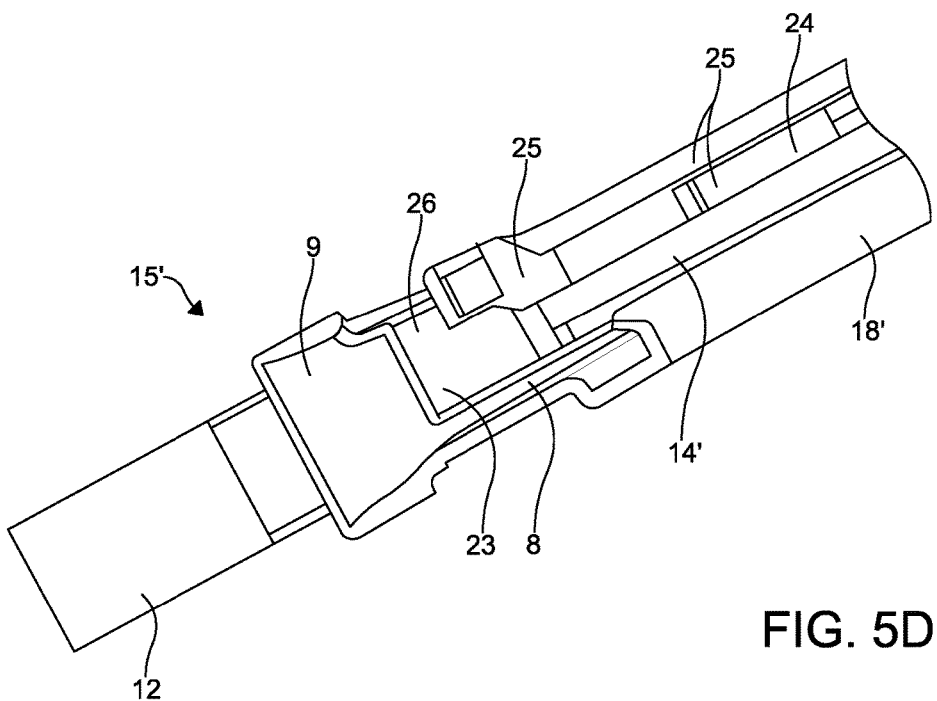
FIG. 5D is a cross-sectional view of the separation component of FIG. 5A that is in the closed state.
Figure 5E:
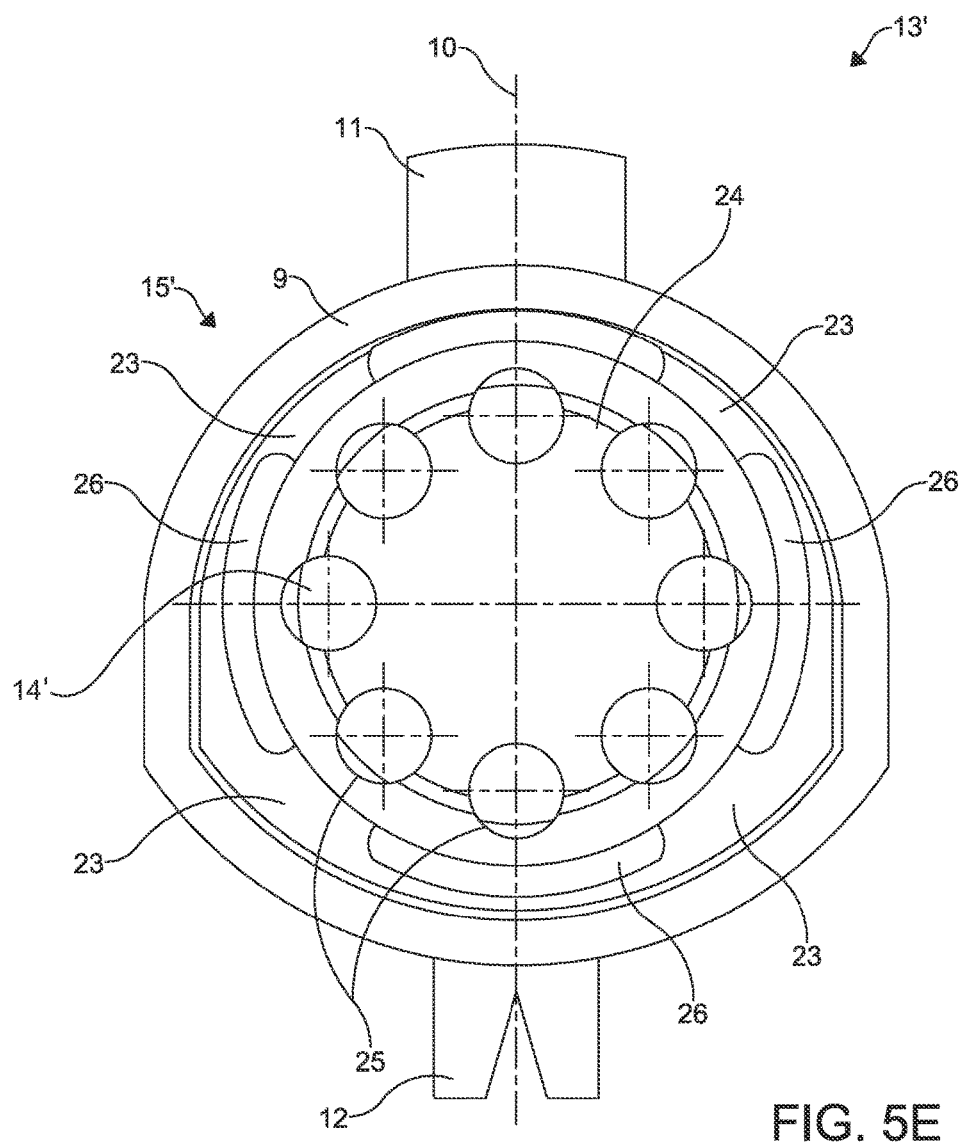
FIG. 5E is a diagram showing the outline structure of the separation component of FIG. 5A.

FIGS. 5A, 5B, 5C, 5D, and 5E show movable separation components 13' according to other embodiments. FIG. 5A shows the separation component 13' that may be immediately mounted, FIG. 5B shows an exploded view of the separation component 13' for illustrating individual components, FIGS. 5C and 5D show cross sections of the components, and FIG. 5E is a plan view of a conceptual structure of the separation component 13'. FIG. 5C shows the separation component 13' in the open state, and FIG. 5D shows the separation component 13' in the closing state.

A stop component 15' also includes a face 8 having an edge 9 in which a locking component 11 and a retention component 12 are formed. An internal contour 18' having a circular opening part shape is provided at the center of the face 8. The circular opening part, that is, an entrance, is extended across most parts of the face 8.

The face 8 includes guide components 23 that are uniformly distributed and disposed over a circumference in a part where transfer to the edge 9 is carried out. The four guide components 23 formed in a step shape are provided as circular segments each having a step part. The first arc faces of the step part that are laid on the face 8 and directed toward the center point of the circle function to guide a closing component 14' that may be moved in a straight line. The faces of a step part that is connected to the edge and disposed in the length direction L and the faces of a step part that is connected to the edge and directed toward the center point of the circle function as parts for supporting and fixing a second stop component 24.

Upon fabrication or assembly, the second stop component 24 is placed on the step parts of step parts of the guide components 23 in a concentric form to the center point of the circle of the guide components 23 formed of circular segments and then soldered thereto. In such a case, the second stop component 24 is spaced apart from the first stop component 15' in the height of the step parts. In this case, a gap between the stop components 15' and 24 determines the size of a movement of the closing component 14'.

The closing component 14' that may be moved in a straight line, corresponding to a strike plate 14', is disposed between the space between the face 8 of the first stop component 15', corresponding to a baffle plate 15', and the second stop component 24. In this case, the closing component 14' that may be moved in a straight line is retained between the stop components 15' and 24 in such a way to move therebetween and is guided from the first arc faces of a step part of the guide components 23 that is directed toward the center point of the circle.

The first arc faces of a step part of the guide components 23 and the side of the closing component 14' that may be moved in a straight line are engaged with each other, thereby guaranteeing guidance.

The second stop component 24 that is circularly formed includes holes disposed in its outer circumference or opening parts 25 having a punching part shape. In this case, in order to assemble and solder the stop components 15' and 24 together, the radius of the stop component 24 is the same as a radius including the tolerance of an arc ace of the step part of the guide component 23 that is connected to an edge and directed toward the center point of the circle.

When the closing component 14' comes in contact with the stop component 24, the opening parts 25 disposed in the length direction L is disposed in the stop component 24 so that at least some of the opening parts 25 or all the opening parts 25 remain open without being covered by the closing component 14' as shown in FIG. 5C. Furthermore, each of the opening parts 25 is formed to have a diameter so that at least some of the opening parts 25 or all the opening parts 25 remain open without being covered by the closing component 14'.

The closing component 14' may freely move between two end locations. At the first end location, as shown in FIG. 5D, the closing component 14' comes in contact with the first stop component 15' and closes the internal contour 18' formed as the opening part. Accordingly, the closing component 14' has a diameter greater than the opening part. The closing component 14' is placed on the face 8. The separation component 13' is closed.

At the second end location, as shown in FIG. 5C, the closing component 14' comes in contact with the second stop component 24 and opens the internal contour 18' of the first stop component 15'. Since the opening parts 25 of the second stop component 24 remain open at least partially at the same time, the open regions of the opening parts 25 may pass between the regions on both sides of the separation component 13'. Furthermore, a gap 26 is formed between the circumference of the stop component 24 and the edge 9 of the stop component 15'. The gap 26 is cut off by only the guide components 23 in the circumferential direction of the stop component 24. Such a gap 26, together with the opening part 25, becomes an additional entrance for a fluid. A fluid passes through the separation component 13' and flows in a flow direction 6 indicated by an arrow. The separation component 13' is open.

As described above with reference to FIG. 3A based on the ratios of the number of flat tubes of the passes and the diameters of the refrigerant lines in the refrigerant entrances 4 and 5, a reduction in the flow cross section of the heat exchanger 1 in the flow direction of a refrigerant in cooling device mode functions to minimize a required space, distribute the heat exchange surfaces so that maximum heat output is achieved, and reduce a pressure loss on the refrigerant side when the refrigerant flows through the heat exchanger 1.

Figure 6:
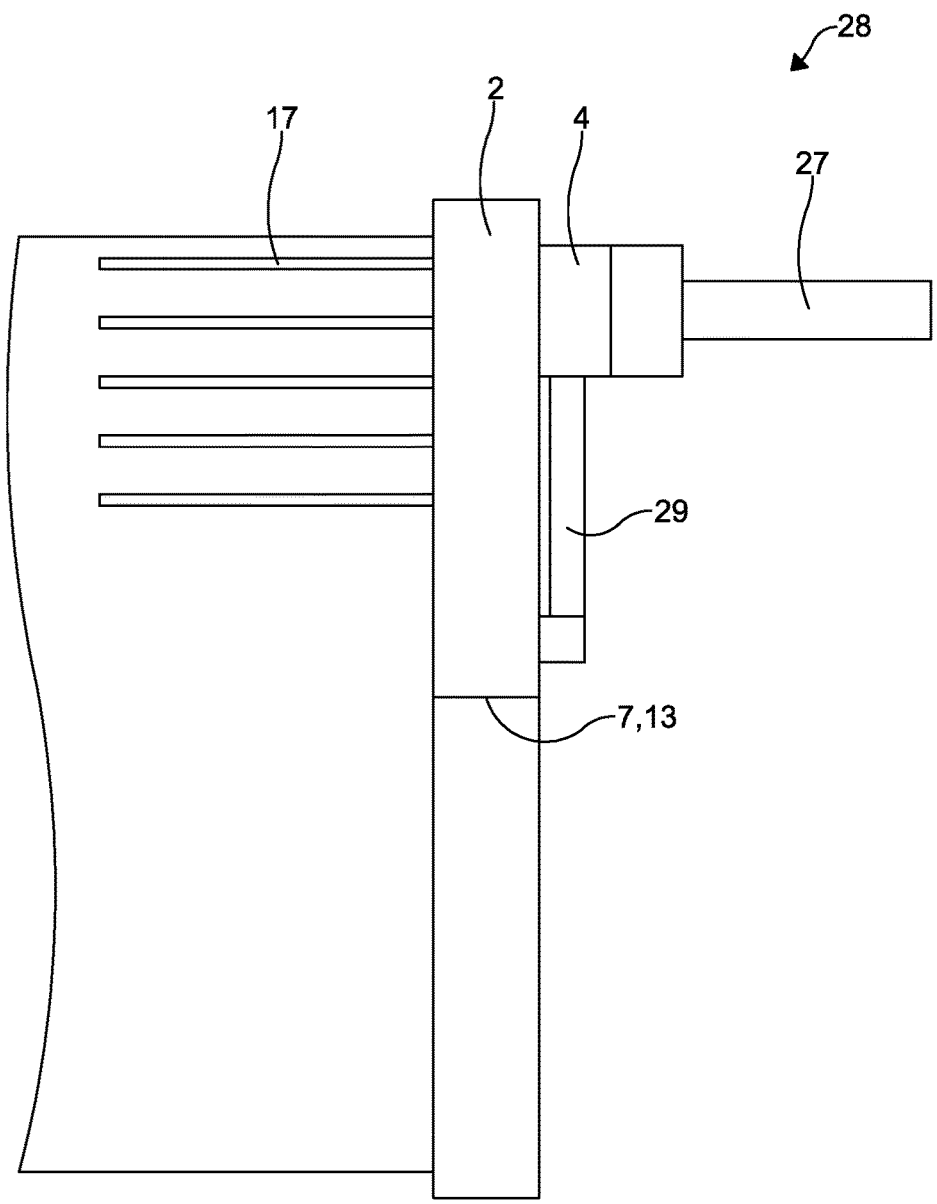
FIG. 6 is a diagram showing a connection block including short lines in the refrigerant entrance of a first header pipe.

FIG. 6 shows a connection block 28 accompanied by short lines 29. In addition to a pressure loss of a refrigerant that is generated due to the flow, mixing, switching, and distribution of the refrigerant through the passes in the header pipes 2 and 3, the refrigerant is converged when it flows through the connection block 28 that connects a refrigerant line 27 to the refrigerant entrances 4. From among them, in particular, a pressure loss when the refrigerant flows through the connection block 28 disposed on the exit side in heat pump mode is significantly great. In order to reduce such a pressure loss, the connection block 28_may have a greater flow cross section than a conventional connection block 28, or the short lines 29 are provided in the conventional connection block 28. The short lines 29 are also called "jumper tubes", and they form a bypass from the header pipe 2 to the connection block 28. Accordingly, the flow cross section of the refrigerant entrance 4 between the header pipe 2 and the refrigerant line 27 is expanded by the cross section of the short lines 29 even without expanding the flow cross section of the refrigerant entrance 4 itself. A pressure loss when the refrigerant is discharged from the heat exchanger 1 is reduced.

The heat exchanger or the apparatus for partitioning the internal volume space of a header pipe of the heat exchanger according to the present invention may have the following excellent advantages different from those of the prior art:

The flat tube profiles 17, the header pipes 2, 3, and the rib structure, that is, the sub-components of the heat exchanger 1, and a method of manufacturing the heat exchanger do not generate additional manufacturing costs, A distribution of the heat exchange surfaces in cooling device mode and heat pump mode is optimized in relation to a heat exchange and pressure loss, A danger of freezing in heat pump mode is minimized, In heat pump mode during thawing, an output loss of the air-conditioning system is prevented, Maximum output is delivered to a refrigerant, and When a heating (auxiliary heating) system operates, efficiency is increased, fuel consumption is reduced, and the mileage of an electric vehicle is increased.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A combined cooling device mode and heat pump mode heat exchanger for an air-conditioning system for a vehicle, comprising:

a first header pipe for receiving a refrigerant;

a second header pipe for receiving the refrigerant spaced apart from and disposed substantially in parallel with the first header pipe;

a first refrigerant entrance in fluid communication with the first header pipe;

a second refrigerant entrance in fluid communication with the second header pipe, the first refrigerant entrance having a flow cross section greater than a flow cross section of the second refrigerant entrance;

a plurality of flow passes, each of the flow passes including a plurality of flow paths disposed substantially in parallel between the first header and the second header, each of the flow paths formed by fluid connection parts and in fluid communication with at least a portion of the first header pipe and at least a portion of the second header pipe, at least one of the flow passes having a flow cross section greater than a flow cross section of an other one of the flow passes and a heat exchange surface greater than a heat exchange surface of the other one of the flow passes; and at least one moveable separation component disposed within at least one of the first header and the second header, the at least one moveable separation component partitioning the at least one of the first header and the second header into independent regions, wherein a flow of the refrigerant through the heat exchanger is a multi-pass flow and a direction of the flow of the refrigerant through the heat exchanger is bidirectional, wherein the refrigerant flows through at least one of the flow passes in a first direction during a cooling device mode of the heat exchanger and the refrigerant flows through the at least one of the flow passes in a second direction during a heat pump mode of the heat exchanger, wherein the first refrigerant entrance conveys the refrigerant to the heat exchanger during the cooling device mode and the second refrigerant entrance conveys the refrigerant to the heat exchanger during the heat pump mode, wherein the at least one moveable separation component including a moveable closing component, a first stop component, and a second stop component, wherein a gap is formed between an outer circumferential surface of the second stop component and an edge of the first stop component, wherein the second stop component has a plurality of openings formed therethrough adjacent and spaced from the outer circumferential surface thereof, and wherein a first portion of each of the plurality of openings is open and a second portion of each of the plurality of openings is closed when the moveable closing component contacts the second stop component such that the gap and the first portion of each of the plurality of openings are flow paths of fluid through the at least one of the first header and the second header.

2. The heat exchanger of claim 1, wherein the first refrigerant entrance has an inside diameter greater than 8 millimeters.

3. The heat exchanger of claim 1, wherein the first refrigerant entrance has an inside diameter greater than 6 millimeters.

4. The heat exchanger of claim 1, wherein the fluid connection parts forming the flow paths are formed from a plurality of flat tube profiles, each of the flat tube profiles having a profile depth of less than 20 millimeters.

5. The heat exchanger of claim 4, wherein the plurality of flow passes includes two flow passes, a ratio of a number of the flat tube profiles of a first pass of the two flow passes to a number of the flat tube profiles of a second pass of the two flow passes is about 3:5.

6. The heat exchanger of claim 4, wherein the plurality of flow passes includes four flow passes, a ratio of a number of the flat tube profiles of a first pass of the four passes to a number of the flat tube profiles of a second pass of the four passes to a number of the flat tube profiles of a third pass of the four passes to a number of the flat tube profiles of a fourth pass of the four passes is about 19:13:10:6.

7. A heat exchanger of refrigerant circuitry of an air-conditioning system for a vehicle, comprising:
a header pipe for receiving a refrigerant;
a plurality of flow paths disposed in parallel and in fluid communication with the header pipe;
at least two refrigerant entrances, at least one of the refrigerant entrances having a connection block configured for connection with a refrigerant line formed therein and at least one short line disposed between the header pipe and the connection block, wherein a direction of a flow of the refrigerant through the heat exchanger is bidirectional and the direction of the flow of the refrigerant within the heat exchanger varies depending on an operation mode of the air-conditioning system, and wherein the refrigerant sequentially flows through the flow paths, the header pipe, and at least one of the refrigerant entrances in a first flow direction; and
a moveable separation component configured for alignment within the header pipe along a length of the header pipe, the moveable separation component further comprising:
a moveable closing component;
a first stop component; and
a second stop component, wherein a gap is formed between an outer circumferential surface of the second stop component and an edge of the first stop component, wherein the second stop component has a plurality of openings formed therethrough adjacent and spaced from the outer circumferential surface thereof, and wherein a first portion of each of the plurality of openings is open and a second portion of each of the plurality of openings is closed when the moveable closing component contacts the second stop component such that the gap and the first portion of each of the plurality of openings are flow paths of fluid through the header pipe.

8. An apparatus for partitioning an internal volume space of header pipes of a heat exchanger and changing a flow of a fluid in the header pipes of the heat exchanger, comprising:
at least one moveable separation component configured for alignment within at least one of the header pipes of the heat exchanger along a length of the at least one of the header pipes, the at least one moveable separation component further comprising:
a moveable closing component;
a first stop component cooperating with the moveable closing component to open and close the at least one moveable separation component based on a differential pressure exerted on the at least one moveable separation component; and
a second stop component, wherein a gap is formed between an outer circumferential surface of the second stop component and an edge of the first stop component, wherein the second stop component has a plurality of openings formed therethrough adjacent and spaced from the outer circumferential surface thereof, and wherein a first portion of each of the plurality of openings is open and a second portion of each of the plurality of openings is closed when the moveable closing component contacts the second stop component such that the gap and the first portion of each of the plurality of openings are flow paths of the fluid through the at least one of the header pipes.

9. The apparatus of claim 8, wherein the first stop component has an internal contour defining an opening for receiving the fluid therethrough when the moveable separation component is open and for cooperating with the moveable closing component to militate against flow of the fluid through the opening when the moveable separation component is closed.

10. The apparatus of claim 8, wherein the moveable closing component moves with respect to the first stop component along the length of the at least one of the header pipes.

11. The apparatus of claim 8, wherein the moveable separation component includes a guide for guiding the movable closing component with respect to the first stop component.

12. The apparatus of claim 11, wherein a plurality of guide components configured to guide the moveable closing component is formed on a face of the moveable separation component, the guide components uniformly disposed in the first stop component along a circumference of an internal contour of the first stop component, each of the guide components is a circular segment having a step part directed toward a center point of the circular segment, and each of the step parts is configured to support and fix the second stop component.

13. The apparatus of claim 11, wherein the guide militates against twisting and rotating of the moveable closing component.

14. The apparatus of claim 8, wherein the at least one movable separation component is disposed in at least one of the header pipes of the heat exchanger to facilitate dynamically changing at least one of a flow cross section and a heat exchange surface of the heat exchanger.

* * * * *